United States Patent
Kong et al.

(10) Patent No.: US 11,760,310 B2
(45) Date of Patent: Sep. 19, 2023

(54) APPARATUS FOR DISPLAYING VEHICLE STATE USING WIPER

(71) Applicants: HYUNDAI MOTOR COMPANY, Seoul (KR); KIA CORPORATION, Seoul (KR)

(72) Inventors: Nak Kyoung Kong, Seongnam-si (KR); Seung Sik Han, Hwaseong-si (KR); Jong Min Park, Seoul (KR); Ki Hong Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 268 days.

(21) Appl. No.: 17/359,985

(22) Filed: Jun. 28, 2021

(65) Prior Publication Data
US 2022/0105900 A1    Apr. 7, 2022

(30) Foreign Application Priority Data
Oct. 6, 2020 (KR) .......................... 10-2020-0128455

(51) Int. Cl.
*B60S 1/04* (2006.01)
*B60Q 1/26* (2006.01)
*B60S 1/08* (2006.01)

(52) U.S. Cl.
CPC .......... *B60S 1/0491* (2013.01); *B60Q 1/2684* (2013.01); *B60S 1/0818* (2013.01); *B60Q 2300/312* (2013.01); *B60S 1/0896* (2013.01)

(58) Field of Classification Search
CPC .. B60S 1/04; B60S 1/0491; B60S 1/32; B60S 1/34; B60S 1/3425; B60S 1/3479; B60S 1/0818; B60S 1/0896; B60Q 1/2684; B60Q 2300/312
USPC .... 15/250.001, 250.351; 362/459, 487, 503; 340/468, 471, 473, 479
See application file for complete search history.

(56) References Cited

U.S. PATENT DOCUMENTS 2,650,355 A * 8/1953 Pieczonka ............. B60S 1/0491
                                                362/540
5,276,937 A * 1/1994 Lan ....................... B60Q 1/2684
                                                362/253

(Continued)

FOREIGN PATENT DOCUMENTS

| DE | 102013013857 | * | 2/2014 |
| DE | 102013226408 | * | 6/2015 |
| DE | 102020205614 | * | 11/2021 |

(Continued)

*Primary Examiner* — Gary K. Graham
(74) *Attorney, Agent, or Firm* — LEMPIA SUMMERFIELD KATZ LLC (57) ABSTRACT

An apparatus for displaying a vehicle state using a wiper includes: a wiper arm located on a glass of a vehicle, a driving motor which is located in a pivot unit coupled to one end of the wiper arm, and rotates the wiper arm, a light source unit located in the pivot unit so as to face the wiper arm, reflection units which are located in the wiper arm and reflect light radiated by the light source unit, and a controller to control a rotational speed of the wiper arm and control light emitted by the light source unit to be radiated to selected reflection units among the reflection units in response to a rotational position of the wiper arm so as to provide a user requested form.

11 Claims, 5 Drawing Sheets

(56) References Cited

U.S. PATENT DOCUMENTS

| | | | | |
|---|---|---|---|---|
| 7,246,403 B2 * | 7/2007 | Ohyama | ............... | B60S 1/32 |
| | | | | 340/468 |
| 8,664,867 B1 * | 3/2014 | Wood | ............... | H05B 45/00 |
| | | | | 15/250.43 |

FOREIGN PATENT DOCUMENTS

| KR | 20-2011-0007258 U | | 7/2011 |
|---|---|---|---|
| WO | 99/59850 | * | 11/1999 |

\* cited by examiner

APPARATUS FOR DISPLAYING VEHICLE STATE USING WIPER

CROSS-REFERENCE TO RELATED APPLICATION

This application claims priority to and the benefit of Korean Patent Application No. 10-2020-0128455, filed on Oct. 6, 2020, the entire contents of which are incorporated herein by reference.

FIELD

The present disclosure relates to an apparatus for displaying a vehicle state using a wiper.

BACKGROUND

The statements in this section merely provide background information related to the present disclosure and may not constitute prior art.

In general, when an abnormality of a vehicle occurs during driving or the vehicle cannot drive due to an unexpected accident, the vehicle is stopped on the shoulder of a road or is stopped at a position where the abnormality of the vehicle occurs.

In order to prevent a secondary accident, such as collision with a following vehicle, a safety triangle, a safety warning lantern or the like is generally placed behind the vehicle by a user of the vehicle.

In one form, technology relating to a safety triangle that is easily stored and deployed has been developed, however, we have found that the safety triangle has a drawback in that a reflective member or a light emitting member thereof uses reflection of light emitted from a vehicle in order to indicate danger, and thus the safety triangle is difficult to detect from a long distance.

Further, because the safety triangle must be installed at a distance of 50 m or more behind the vehicle, a secondary accident may occur in the process of installing the safety triangle.

In addition, warning lights, LEDs or the like installed on the vehicle to indicate danger have limits in informing of an abnormality of the vehicle on an expressway on which a lot of vehicles may move at high speeds, especially at night using light alone, and therefore, vehicles traveling around or following the vehicle at a high speed may not recognize the abnormality of the vehicle and thus a secondary accident may occur.

Therefore, special vehicles which handle accidents, construction vehicles, etc. are configured that an LED sign board on which letters are displayed is installed on the roof of each vehicle so as to allow other vehicles to recognize a danger, such as an accident, construction or the like, from far away, but the LED sign board installed on the special vehicles, the construction vehicles, etc. is voluminous and is thus difficult to install on general vehicles, and moreover, when the LED sign board is installed on a general vehicle, the LED sign board mars the external appearance of the vehicle and incurs excessively high installation costs.

The above information disclosed in this Background section is only for enhancement of understanding of the background of the present disclosure and therefore it may contain information that does not form the prior art that is already known to a person of ordinary skill in the art.

SUMMARY

The present disclosure provides an apparatus for displaying a vehicle state using a wiper which may transmit the state information of a vehicle to the outside of the vehicle.

The present disclosure also provides an apparatus for displaying a vehicle state using a wiper which selectively radiates light applied from a light source unit to reflection units based on the rotational speed of a wiper arm.

In another form of the present disclosure, an apparatus for displaying a vehicle state uses a wiper which includes reflection units having various focal distances and may thus transmit the state information of a vehicle to various distances.

In one aspect, the present disclosure provides an apparatus for displaying a vehicle state using a wiper, the apparatus including: a wiper arm located on a glass of a vehicle, a pivot unit coupled to an end of the wiper arm, a driving motor located in the pivot unit and configured to rotate the wiper arm, a light source unit located in the pivot unit so as to face the wiper arm, reflection units located in the wiper arm and configured to reflect light radiated by the light source unit, and a controller configured to control a rotational speed of the wiper arm and to control light emitted by the light source unit to be radiated to selected reflection units among the reflection units in response to a rotational position of the wiper arm so as to provide a user requested form.

In one form, the light source unit may include a digital micromirror device and is inclined at a designated angle so as to correspond to the reflection units.

In another form, each of the reflection units reflects the light radiated by the light source unit so as to form a focus at a predetermined distance from an upper surface of the wiper arm.

In still another form, neighboring reflection units among the reflection units may form focuses at different distances from an upper surface of the wiper arm.

In yet another form, the apparatus may further include a cover located on the wiper arm and configured to seal the light source unit.

In still yet another form, the controller may be configured to rotate the wiper arm at a speed of 30 revolutions per minute (RPM) or higher.

In a further form, the light radiated by the light source unit may have a luminous intensity of 60 cd to 300 cd.

In another further form, the controller may be configured to control the light source unit to radiate the light when an angular variation of the wiper arm is less than 10 degrees.

In still another further form, the controller may be configured to rotate the wiper arm in response to input of an emergency alert button of the vehicle, and to control the light source unit to emit the light so as to correspond to an alert type of the vehicle.

In another form, the controller may rotate the wiper arm in response to input of turning lights, and control the light source unit to emit the light so as to correspond to a lane change direction of the vehicle, when a rainfall amount measured by a rain sensor of the vehicle is equal to or greater than a predetermined rainfall amount.

In still another further form, the user requested form may include at least one of letters, numbers or signs.

Other aspects and exemplary forms of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

Hereinafter reference will be made in detail to various forms of the present disclosure, examples of which are illustrated in the accompanying drawings and described below. While the present disclosure will be described in conjunction with exemplary forms, it will be understood that the present description is not intended to limit the present disclosure to the exemplary forms. On the contrary, the present disclosure is intended to cover not only the exemplary forms, but also various alternatives, modifications, equivalents and other forms, which may be within the spirit and scope of the present disclosure.

In the following description of the exemplary forms, it will be understood that the suffixes "part", "device", etc. indicate units for processing at least one function or operation, and may be implemented using hardware, software, or a combination of hardware and software.

In the following description of the present disclosure, the same or similar elements are denoted by the same reference numerals even when they are depicted in different drawings, and a detailed description thereof will be omitted because it is considered to be unnecessary.

In addition, the term 'glass' in the following description of the present disclosure conceptually encompasses a front glass, a rear glass and a side glass, and means all target objects on which a wiper device may be located.

The present disclosure relates to an apparatus 100 for displaying a vehicle state using a wiper and, in the following description, a display apparatus 100 which provides a state display image of a vehicle using a wiper device located on the upper surface of a glass 300 will be described. However, the apparatus 100 may be applied to a wiper arm 110 which may be mounted on a vehicle, particularly to the front portion or the rear portion of the vehicle, and a target object to which the apparatus 100 is applied is not limited to a rear wiper device.

Figure 1:
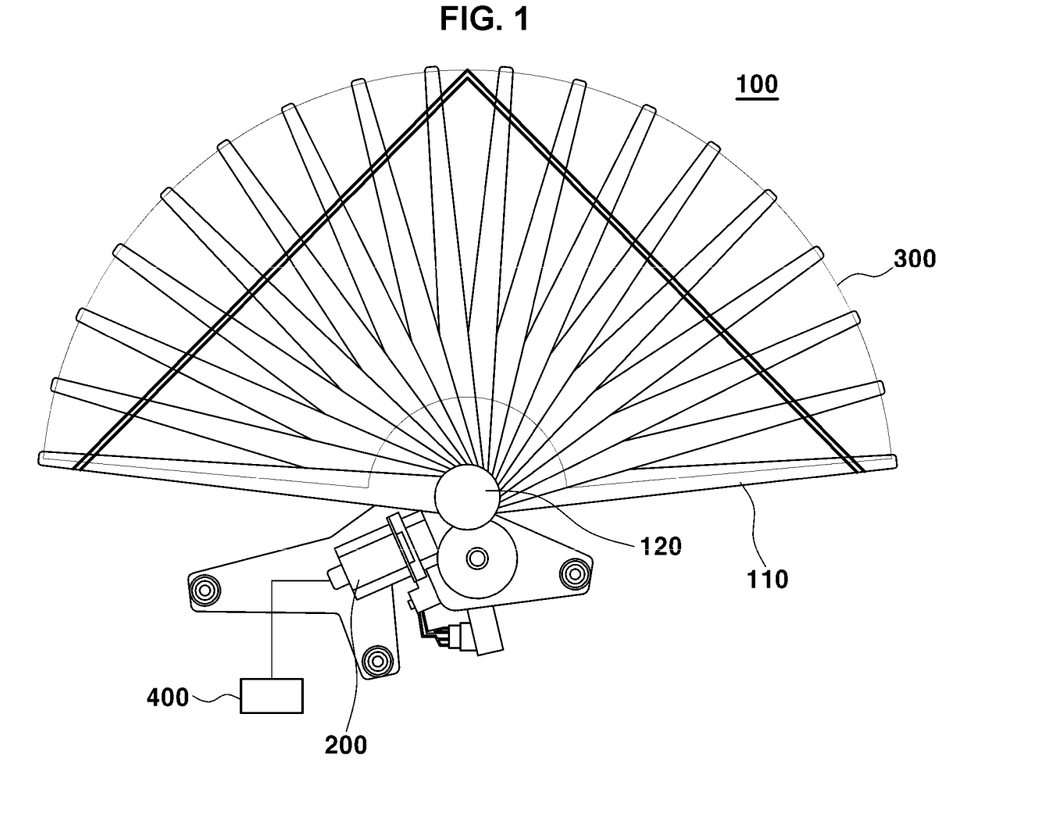
FIG. 1 is a front view of an apparatus for displaying a vehicle state using a wiper according to one form of the present disclosure.

FIG. 1 is a front view of an apparatus 100 for displaying a vehicle state using a wiper located on the upper surface of a glass 300 according to one form of the present disclosure.

The apparatus 100 is provided on a wiper device located on the upper surface of the glass 300, and includes a driving motor 200 configured to rotate a wiper arm 110, a pivot unit 120 configured to surround at least a portion of the driving motor 200 and to accommodate a light source unit 130 therein, the wiper arm 110 configured to have one end coupled with the pivot unit 120, and the wiper (not shown) located between the wiper arm 110 and the glass 300.

The driving motor 200 located in the pivot unit 120 includes a rotating unit configured to be rotated integrally with the wiper arm 110 and a light source unit 130 located on the rotating unit at a position facing the wiper arm 110.

One end of the wiper arm 110 is couped to the pivot unit 120, and the wiper arm 110 extends such that at least one portion thereof is adjacent to the glass 300, and includes the wiper coupled thereto so as to be provided between the glass 300 and the wiper arm 110. Further, the wiper arm 110 is configured to be rotated on the upper surface of the glass 300 using the rotating force of the driving motor 200.

Reflection units 140 are provided in the upper surface of the wiper arm 110 at a position facing the light source unit 130. The light source unit 130 may be oriented at a designated angle so as to face the reflection units 140. In one form of the present disclosure, a plurality of reflection units 140 may be provided along the wiper arm 110, and the light source unit 130 may be controlled by a controller 400 so as to apply light to the respective reflection units 140.

The light source unit 130 may include a digital micromirror device, and be configured to radiate incident light corresponding to each of the reflection units 140. Thereby, the light source unit 130 may radiate a beam of light to each of the reflection units 140, which are spaced apart from each other, or radiate a plurality of beams of light to the reflection units 140, and be configured to radiate light to the reflection units 140 which are set based on user input or the driving environment of the vehicle. Further, the controller 400 is configured to control the light source unit 130 so as to radiate light to the reflection units 140 corresponding to a display image based on the rotational speed of the wiper arm 110.

The reflection units 140 are located along the wiper arm 110 in the length direction thereof, and are configured to be oriented at a designated angle so that light radiated by the light source unit 130 is incident thereon and is then reflected thereby. The reflection units 140 have a shape which is indented into the upper surface of the wiper arm 110, and include reflection surfaces facing the light source unit 130. More particularly, at least some of the reflection units 140 are configured to form one focus and the remainder of the reflection units 140 are configured to form another focus so that light reflected by all the reflection units 140 may form different focuses.

That is, the reflection units 140 may be oriented at different angles relative to the wiper arm 110 so as to form at least one focus. Further, in one form of the present disclosure, two neighboring reflection units 140 are configured to form two different focuses. Therefore, the reflection units 140 are configured such that a state display image of the vehicle may be recognized at a relatively short distance and a relatively long distance.

The controller 400 is configured to control the driving environment of the vehicle, the rotational speed of the wiper arm 110, and the radiation angle of light from the light source unit 130 (to a position corresponding to designated reflection units 140). In one form of the present disclosure, the controller 400 controls the wiper arm 110 to be rotated and simultaneously controls the light source unit 130 to radiate light to the set reflection units 140 based on user input relating to the state display image of the vehicle.

More particularly, the controller 400 controls the wiper arm 110 to be rotated at a speed of 30 RPM or higher, and light radiated by the light source unit 130 has a luminous intensity of 60 cd to 300 cd. Further, the controller 400 may control the number of times of light radiation by the light source unit 130 in consideration of the angular variation of the wiper arm 110, and in this case, the controller 400 may control the light source unit 130 to radiate light when the angular variation of the wiper arm 110 is less than 10 degrees.

That is, the controller 400 may control the radiation position of light by the light source unit 130 and the number of times of light radiation of the light source unit 130 in consideration of the rotational speed and the angular variation of the wiper arm 110, thereby displaying the state of the vehicle through an afterimage effect.

In addition, the controller 400 may determine a rainfall amount with regard to the driving environment of the vehicle, application of an emergency light on/off request signal as a vehicle state display request signal from a user, etc., and control the apparatus 100 based thereon. The controller 400 may control the light source unit 130 to radiate light to the reflection units 140 having different focal distances depending on the driving position of the vehicle, and selectively control a display image by recognizing a climatic environment.

In one form of the present disclosure, the controller 400 may receive information about a road on which the vehicle is currently driving, and may control the light source unit 130 to radiate light to the reflection units 140 having the long focal distance in response to application of a warning light on/off signal when failure of the vehicle occurs and thus the vehicle becomes difficult to drive.

Further, in another form of the present disclosure, the controller 400 may rotate the wiper arm 110 and control the light source unit 130 to display the state of the vehicle, which is substantially the same as a warning light, in response to application of a warning light on/off request signal from the user. In addition, the controller 400 may display a lane change request state through the wiper arm 110 in connection with turn signal lights of the vehicle when a rainfall signal received from a rain sensor is equal to or greater than a predetermined reference value.

In one form, the controller 400 may determine a road on which the vehicle is currently driving, climate information during driving, and whether or not the vehicle is in a drivable state as driving environment information of the vehicle, provide a display image corresponding to the determined driving environment information, calculate a distance to which the display image is to be recognized, and may control the light source unit 130 to radiate light to the corresponding reflection units 140.

The display image may be displayed by simultaneously controlling a point in time at which the light source unit 130 emits light and the speed of the wiper arm 110 in response to various forms, such as letters, numbers, signs, etc., according to a user's setting.

Figure 2:
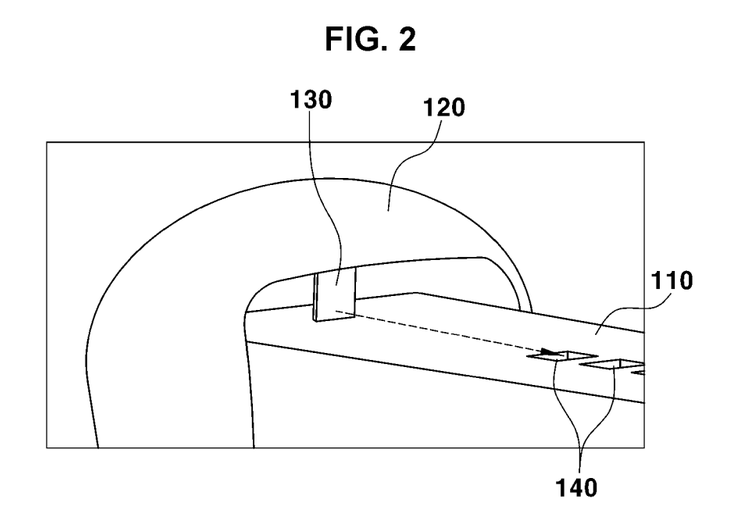
FIG. 2 is a view illustrating a light source unit of the apparatus according to one form of the present disclosure.

FIG. 2 illustrates the coupling relationships between the pivot unit 120 and the light source unit 130 located therein according to one form of the present disclosure.

The light source unit 130 is configured to be located in the pivot unit 120, and is rotated integrally with the rotating unit by the driving motor 200. Further, the light source unit 130 is configured to face one open surface of the pivot unit 120, to which the wiper arm 110 is coupled, so as to radiate light through the open surface of the pivot unit 120.

Because the light source unit 130 may employ a digital micromirror device, the light source unit 130 may be configured to radiate light to at least one reflection unit 140 using one chip, into which a plurality of reflective devices is integrated, in order to realize colors such as red, green and blue.

As such, when the controller 400 controls a point in time at which the light source unit 130 radiates light, various types of state display messages and various colors may be realized through rotation of the wiper arm 110.

Figure 3:
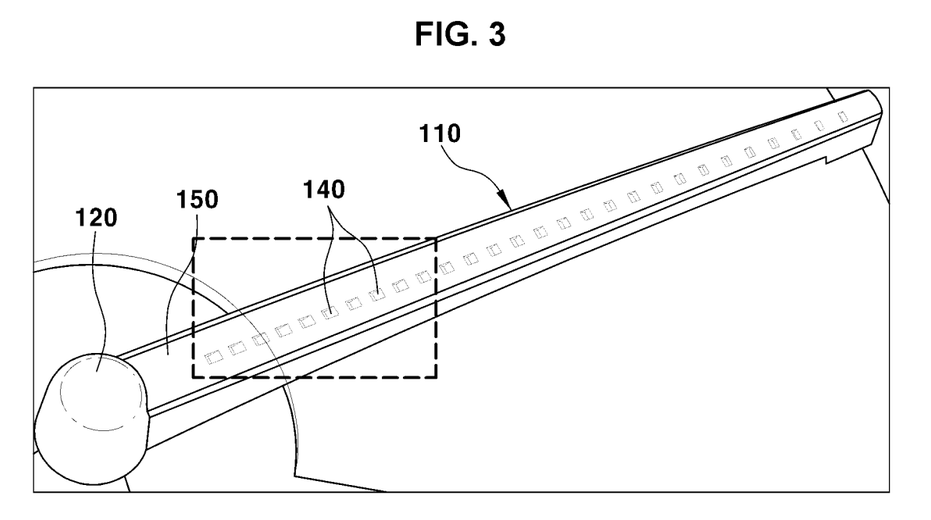
FIG. 3 is a view illustrating a wiper arm of the apparatus according to one form of the present disclosure.
Figure 4:
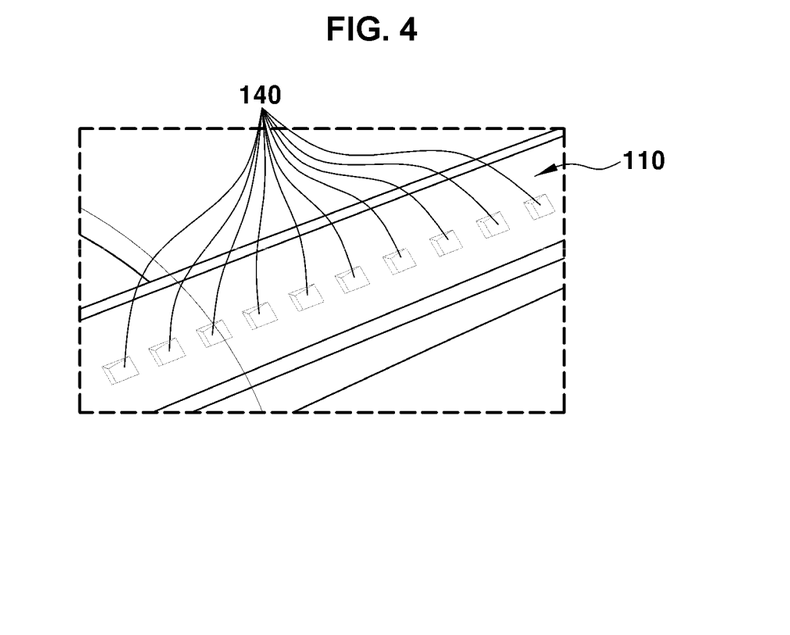
FIG. 4 is a view illustrating reflection units of the apparatus according to one form of the present disclosure.

FIGS. 3 and 4 are enlarged views of the wiper arm 110 including the reflection units 140 according to some forms of the present disclosure.

One end of the wiper arm 110 is coupled to the pivot unit 120, and the wiper arm 110 includes the wiper coupled to the wiper arm 110 so as to be provided between the glass 300 and the wiper arm 110. The reflection units 140 may be located along the wiper arm in the length direction thereof and be configured such that the respective reflection units 140 are spaced apart from each other by the same distance.

The reflection units 140 may be areas which are indented so as to form a designated angle relative to the horizontal surface of the wiper arm 110, and the regions of the reflection units 140, which face light radiated by the light source unit 130, are deposited or painted with Al or Ag. Therefore, the reflection units 140 may be configured to have reflectance of 90% or higher.

As shown in these figures, the reflection units 140 are configured to face the light source unit 130, located in the pivot unit 120, at designated angles, so as to reflect light incident from the light source unit 130 to predetermined focal distances behind the vehicle. Further, the reflection units 140 may be configured to form different focuses from neighboring reflection units 140, and light incident from the light source unit 130 on the reflection units 140 configured to form the different focuses may form a display image at different positions behind the vehicle.

A cover 150, which is fixed to the wiper arm 110 and configured to prevent foreign substances from entering the reflection units 140, is provided on the upper surfaces of the reflection units 140. The cover 150 is formed of a transparent material, such as polycarbonate (PC) or polymethyl methacrylate (PMMA), so as to protect the reflection units 140 and to pass light reflected by the reflection units 140.

As such, the reflection units 140 may include reflective surfaces, each of which is configured to be oriented at a designated angle relative to the light source unit 130, and each of the reflective surfaces may form a designated angle of reflection so as to form at least one focus. Further, two neighboring reflective surfaces may form different focuses, and thus, the light source unit 130 may be configured to simultaneously radiate light to at least two neighboring reflection units 140 in order to provide one display image. Therefore, light reflection may be performed such that one display image has two different focal lengths, and thus the same display image is formed in two focus areas having different distances from the vehicle.

As described above, according to one form of the present disclosure, two neighboring reflection units 140 may be configured to form different focuses, and a display image desired to be provided by the apparatus 100 may be recognized at different distances behind the vehicle.

Figure 5:
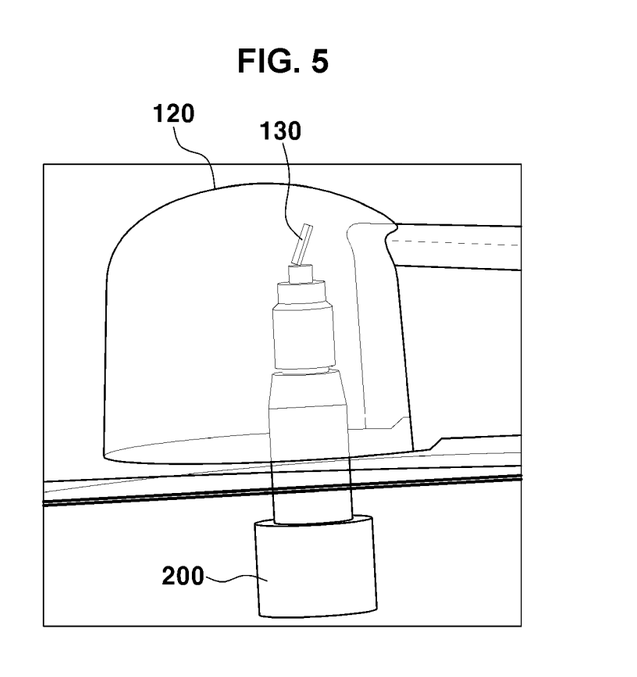
FIG. 5 is a cross-sectional view of the light source unit of the apparatus according to one form of the present disclosure.

FIG. 5 is a cross-sectional view of the pivot unit 120 according to one form of the present disclosure.

As shown in this figure, the driving motor 200 is provided in the pivot unit 120, and the wiper arm 110 is coupled to the rotating unit of the driving motor 200. The wiper arm 110 is configured to be rotated integrally with the driving motor 200, and the light source unit 130 coupled to the upper surface of the rotating unit is configured to be rotated integrally with the wiper arm 110.

The driving motor 200 is configured such that power from a battery located in the vehicle is applied thereto, and the light source unit 130 is configured to be connected to the battery located in the vehicle. Therefore, the controller 400 may control power applied to the driving motor 200 and the light source unit 130, more particularly, control the rotational speed of the driving motor 200.

In one form of the present disclosure, the minimum rotational speed of the wiper arm 110 to provide an afterimage effect may be set to 30 RPM, and the light source unit 130 may be controlled to radiate light when the angular variation of the wiper arm 110 is less than 10 degrees.

Figure 6A:
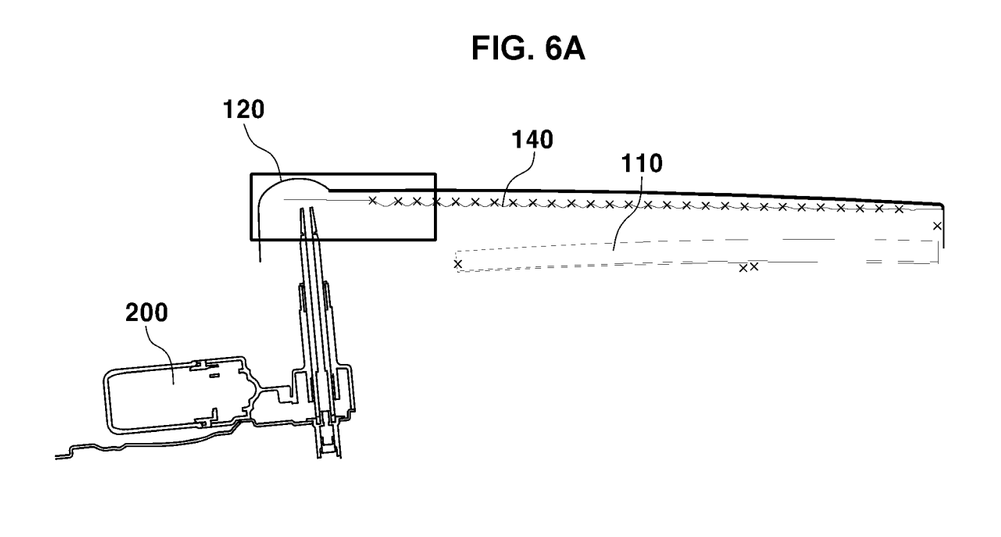
FIG. 6A is a view illustrating paths of light reflected by the reflection units of the apparatus according to one form of the present disclosure.
Figure 6B:
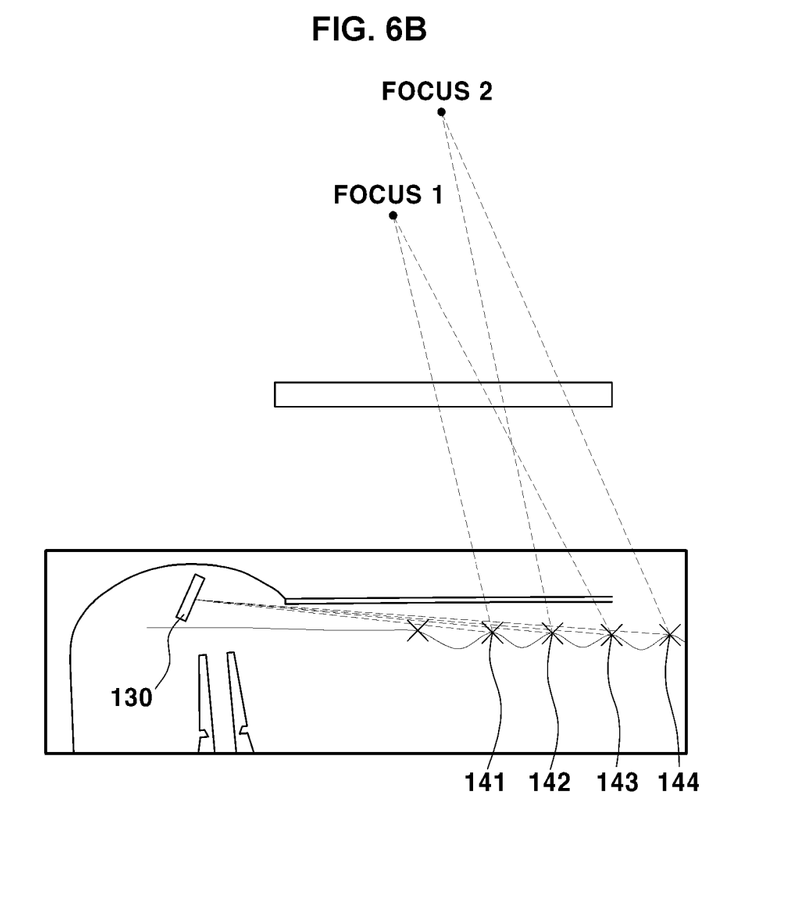
FIG. 6B is an enlarged view of FIG. 6A.

FIG. 6A is a view illustrating paths of light which is radiated by the light source unit 130 and is then reflected by the reflection units 140 according to one form of the present disclosure, and FIG. 6B is an enlarged view of FIG. 6A.

As shown in these figures, the light source unit 130 radiates light to at least one reflection unit 140 located in the wiper arm 110, and the light incident upon the respective reflection units 140 is reflected to the outside of the rear portion of the vehicle. The light source unit 130 may radiate a beam of light corresponding to each of the reflection units 140 to each of the reflection units 140, or simultaneously radiate a plurality of beams of light to the reflection units 140.

Among the refection units 140, the reflection unit 140 which is closest to the light source unit 130, may be referred to as a first reflection unit 141, and FIG. 6B illustrate four reflection units 140: the first reflection unit 141, a second reflection unit 142, a third reflection unit 143 and a fourth reflection unit 144. As shown in these figures, light incident upon and then reflected by the first reflection unit 141 and the third reflection unit 143 may form a focus at a position close to the upper surface of the wiper arm 110, and light incident upon and then reflected by the second reflection unit 142 and the fourth reflection unit 144 may form a focus at a position more distant from the upper surface of the wiper arm 110 than the focus formed by the light reflected by the first reflection unit 141 and the third reflection unit 143.

That is, even when a display image is displayed on the wiper arm 110, positions, at which the display image is formed, may be made different through the reflection units 140 having different focal distances, and the apparatus 100 may provide an image which may be recognized both at a relatively short distance and a relatively long distance from the wiper arm 110.

As shown in these figures, one form of the present disclosure may provide the apparatus 100 configured to form two different images outside the wiper arm 110 based on the configuration of the reflection units 140 which form two different focuses, i.e., a focus 1 and a focus 2.

The present disclosure provides an apparatus 100 for displaying a vehicle state using a wiper, which may provide an afterimage effect generated when the wiper arm 110 is rotated using one light source unit 130 located in a pivot unit 120, and provide a display image recognizable at various distances through a combination of reflection units 140 configured to form different focal distances.

As is apparent from the above description, an apparatus for displaying a vehicle state using a wiper according to one form of the present disclosure has the following effects due to the above-described configuration and coupling and using relationships.

The apparatus may display the state of a vehicle to the outside, thereby being capable of reducing the risk of secondary accidents.

Further, the apparatus according to one form of the present disclosure includes reflection units having a plurality of focal distances so as to display the state of the vehicle at various distances, thereby allowing other vehicles to more easily recognize the state of the subject vehicle.

The present disclosure has been described in detail with reference to exemplary forms thereof. However, it will be appreciated by those skilled in the art that changes may be made in these forms without departing from the principles and spirit of the present disclosure.

What is claimed is:

1. An apparatus for displaying a vehicle state using a wiper, the apparatus comprising:
   a wiper arm located on a glass of a vehicle;
   a pivot unit coupled to an end of the wiper arm;
   a driving motor located in the pivot unit and configured to rotate the wiper arm;
   a light source unit located in the pivot unit and configured to face the wiper arm;
   reflection units located in the wiper arm and configured to reflect light radiated by the light source unit; and
   a controller configured to:
      control a rotational speed of the wiper arm, and
      control the light emitted by the light source unit to be radiated to selected reflection units among the reflection units in response to a rotational position of the wiper arm so as to provide a user requested form.

2. The apparatus of claim 1, wherein the light source unit comprises a digital micromirror device and is inclined at a designated angle so as to correspond to the reflection units.

3. The apparatus of claim 1, wherein each reflection unit of the reflection units is configured to reflect the light radiated by the light source unit and form a focus at a predetermined distance from an upper surface of the wiper arm.

4. The apparatus of claim 1, wherein neighboring reflection units among the reflection units are configured to form focuses at different distances from an upper surface of the wiper arm.

5. The apparatus of claim 1, further comprising a cover located on the wiper arm and configured to seal the light source unit.

6. The apparatus of claim 1, wherein the controller is configured to rotate the wiper arm at a speed of 30 revolutions per minute (RPM) or higher.

7. The apparatus of claim 1, wherein the light radiated by the light source unit has a luminous intensity of 60 cd to 300 cd.

8. The apparatus of claim 1, wherein the controller is configured to control the light source unit to radiate the light when an angular variation of the wiper arm is less than 10 degrees.

9. The apparatus of claim 1, wherein the controller is configured to:
- rotate the wiper arm in response to an input of an emergency alert button of the vehicle, and
- control the light source unit to emit the light so as to correspond to an alert type of the vehicle.

10. The apparatus of claim 1, wherein the controller is configured to:
- rotate the wiper arm in response to an input of turning lights, and
- control the light source unit to emit the light so as to correspond to a lane change direction of the vehicle when a rainfall amount measured by a rain sensor of the vehicle is equal to or greater than a predetermined rainfall amount.

11. The apparatus of claim 1, wherein the user requested form comprises at least one of letters, numbers or signs.

* * * * *